INVENTORS
GEORGE B. PARRENT JR.
PHILIP S. CONSIDINE
ALBERT E. SMITH
BY

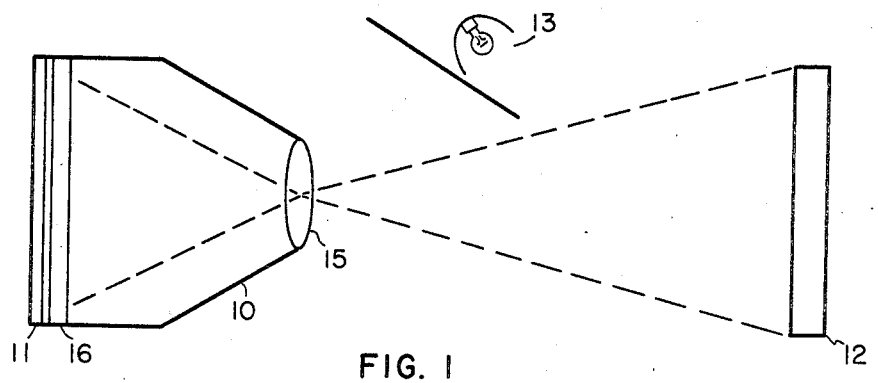
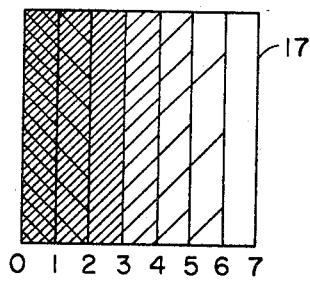
FIG. 2
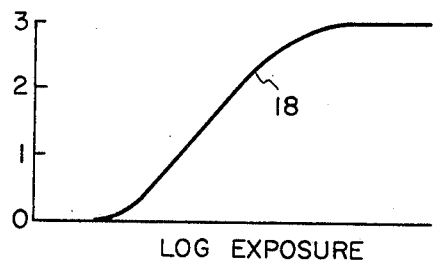
FIG. 3
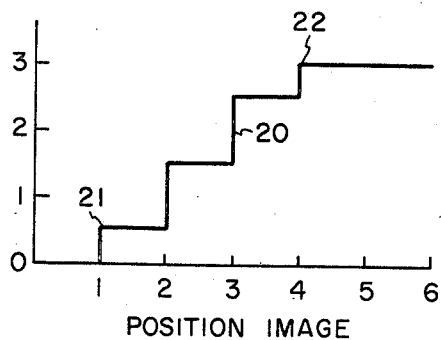
FIG. 4
INVENTORS
GEORGE B. PARRENT JR.
PHILIP S. CONSIDINE
ALBERT E. SMITH
ATTORNEYS

ATTORNEYS

Jan. 6, 1970  G. B. PARRENT, JR., ET AL  3,488,118
PHOTOGRAPHIC DENSITY FILTERS
Filed April 21, 1966  4 Sheets-Sheet 3

INVENTORS
GEORGE B. PARRENT JR.
PHILIP S. CONSIDINE
ALBERT E. SMITH
BY
ATTORNEYS

Jan. 6, 1970  G. B. PARRENT, JR., ET AL  3,488,118
PHOTOGRAPHIC DENSITY FILTERS
Filed April 21, 1966  4 Sheets-Sheet 4
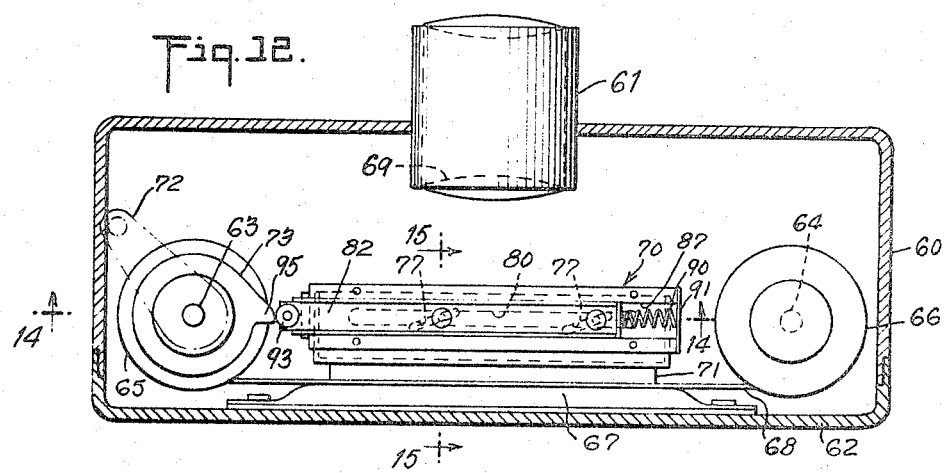
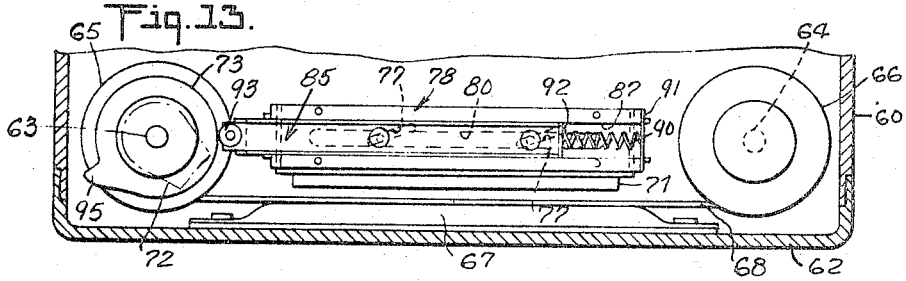
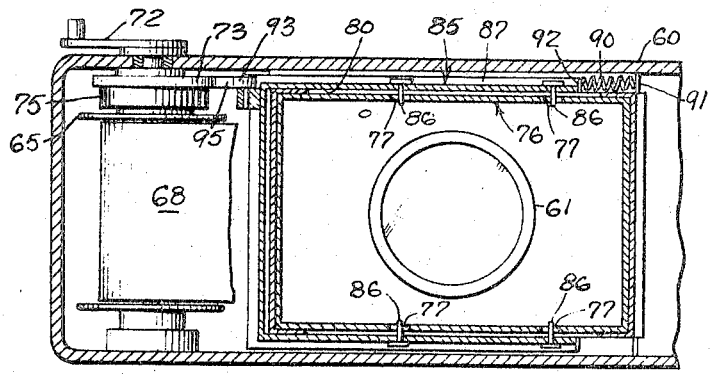
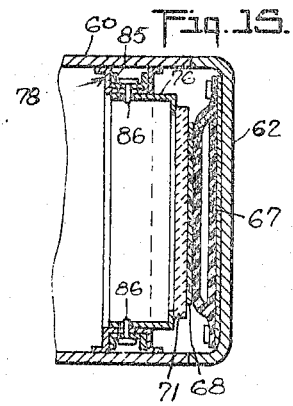
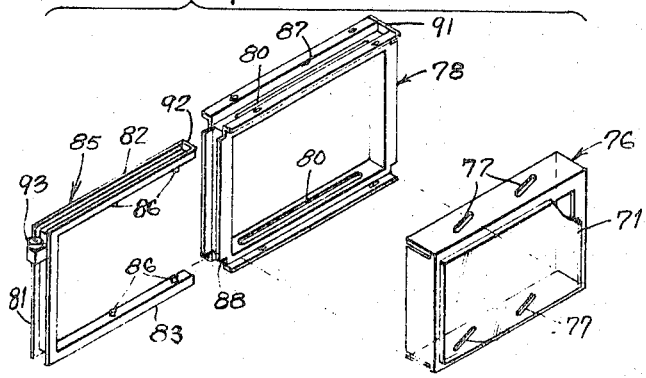
GEORGE B. PARRENT JR.
PHILIP S. CONSIDINE
ALBERT E. SMITH
BY
ATTORNEYS

United States Patent Office 3,488,118
Patented Jan. 6, 1970

3,488,118
PHOTOGRAPHIC DENSITY FILTERS
George B. Parrent, Jr., Carlisle, Philip S. Considine, Woburn, and Albert E. Smith, South Lancaster, Mass., assignors to Technical Operations Incorporated, Burlington, Mass., a corporation of Delaware
Filed Apr. 21, 1966, Ser. No. 545,800
Int. Cl. G03b 27/76
U.S. Cl. 355—71                    9 Claims

ABSTRACT OF THE DISCLOSURE

The specification discloses optical filters of stepped density for extending the dynamic range of films by modulating images recorded thereon in steps of varying density.

---

In photography, scenes are frequently encountered having a dynamic intensity range exceeding the limits of the film response. Various measures have been taken to compensate for this. Special low contrast films have been developed. Also, a sequence of exposures have been made to the same scene with different intensities producing a series of photographic images in which each one emphasizes contrast from a given object density range. Again the series of images described above are sometimes combined to produce a single image of expanded range.

A half-tone technique is employed in the graphic arts for extending the effective dynamic range in a reproduction. This technique employs what is known as a "soft" screen. A soft screen conventionally contains a plurality of circular areas (dots) of variable density. For example, each dot may be substantially transparent at its center and increasingly opaque toward its edges. The soften screen is placed against either the subject or the photo-sensitive reproducing material and the size of the spots that receive enough light for reproduction will vary in diameter with the intensity of the light impinging on the respective dot. Similar results are sometimes achieved using a "hard" screen (constant density dots) that is placed slightly out of contact.

Such half-tone techniques have in the past been employed in the graphic arts where an on-off sort of image (i.e., no tones) is required. Their purpose is to produce the appearances of continuous tones while using half-tone. As will be seen, it is a purpose of the present invention to apply related techniques to continuous tone photography to modify dynamic range characteristics. These same problems and the same types of corrective steps apply equally to electrophotography and the present application is directed equally to that field.

In accordance with the present invention it has been found that, using a fine mosaic of density filters with two or more densities represented in the filter, the effective density vs. log exposure curve of the photographic process can be flattened out to a considerable degree. The discrete filter cells being small enough so as not to create a visible disturbance, the different intensities as viewed through the different cells are averaged out by the eye to produce detail otherwise lost in the toe and shoulder of the H and C curve. It has further been found that using such mosaic filters provides a means of diffracting the resultant image into diffraction of the mosaic modulation with the H and D curve of the film permits the use of spatial filtering to obtain images that are sharply peaked at any desired point along the H and D curve of the film. Thus, it is an object of the present invention to effectively expand the dynamic range of the photographic and electrophotographic processes.

A further object of the invention is to define mosaic filters for controlling the effective density vs. log exposure curve of photosensitive reproducing processes.

A further object of the invention to define methods and means for combining density filtering in photographically recording an image with spatial filtering in viewing the images so as to control contrast emphasis vs. density range in the viewed image.

It is still a further object of the invention to define a hand held camera device containing a mosaic density screen. Further objects and features of the invention will become apparent upon reading the following specification with reference to the drawings in which:

FIG. 1 is a diagrammatic illustration of a camera using a mosaic density filter in accordance with the invention.

FIG. 2 is a step wedge grey scale.

FIG. 3 is a graph of a representative H and D curve of the photographic process.

FIG. 4 is a graphical representation of a photographic reproduction of the FIG. 2 step wedge as limited by the H and D curve of FIG. 3.

FIG. 12 is a plan view, top removed, of camera mechanism set for making an exposure.

FIG. 13 is the view of FIG. 12 with the mechanism set for film winding.

FIG. 14 is partial section on 14—14 of FIG. 12.

FIG. 15 is a partial section on 15—15 of FIG. 12.

FIG. 16 is an exploded view of filter moving parts.

Figure 5:
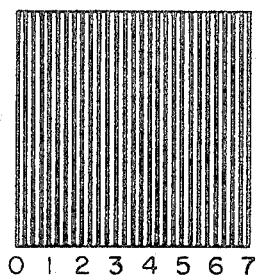
FIG. 5 is a square wave density filter.

A greatly simplified diagram of a camera 10 is depicted in FIG. 1 containing a photographic plate 11 being exposed to illumination reflected from subject 12. Light source 13 is the illuminating source. Lens system 15 focuses the image on plate 11 and a density filter is in contact with the sensitive surface of plate 11.

To determine the dynamic range capability of plate 11, a grey scale wedge 17, as depicted in FIG. 2, can be used as subject 12. The exposure should be for a time and intensity such that the middle of grey scale wedge 17 falls near the center of the H and D curve for plate 11.

FIG. 3 illustrates a typical H and D curve 18 for the photographic process.

Figure 6:
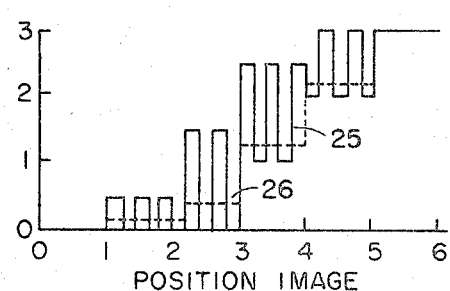
FIG. 6 is a graphical representation of a photographic reproduction of the FIG. 2 step wedge as modified by the square wave filter of FIG. 5.

FIG. 4 represents a densitometer tracing 20 of the reproduced image on plate 11. It will be seen that the first five steps of the grey scale 17 have been distinctively reproduced. The last two steps were lost in the saturation portion of the H and D curve. The first and last grey scale steps reproduced as indicated at steps 21 and 22 in FIG. 4 are diminished due to the "toe" and "shoulder" portions respectively of the H and D curve. FIG. 5 illustrates a square wave filter 23 of alternating transparent and grey equal width bars. When this filter is positioned in contact with plate 11 during exposure to wedge 17, the resultant densitometer tracing can be represented by the graph FIG. 6. Filter 23 has a "chopping" effect on the image as depicted by graph line 25. With a high frequency filter 23, the eye will average the chopping effect and the image will appear to have the characteristic of dashed line 26. This is not just an average of densities but the logarithm of the reciprocal of means transmission. FIG. 6 shows that a sixth grey scale step has been reproduced as a result of adding filter 23. Thus, the addition of filter 23 has the net effect of increasing the dynamic range of the photographic plate. If square wave filter 23 varies between a density of 0 and 2, the effective characteristic curve will show a range of at least two exposure units or 20 db more than the original curve. Increasing the density variation of the filter will increase the effective range.

Figure 7:
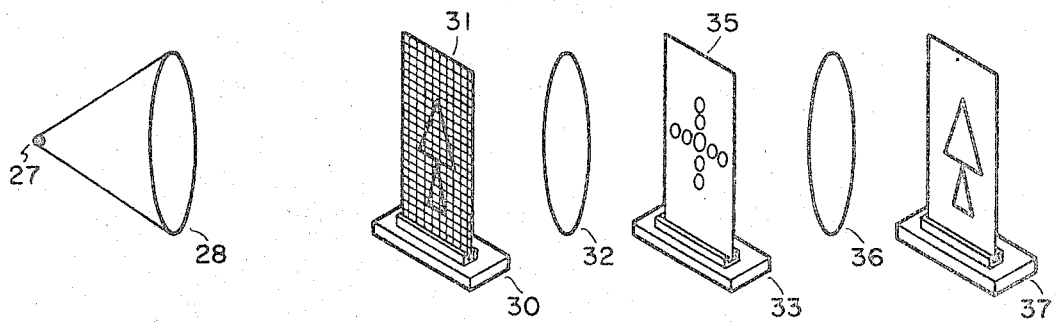
FIG. 7 is an isometric of a coherent optical system for spatial filtering in accordance with the invention.

The "chopping" introduced by the filter has a further interesting feature. With filter 23 in contact with plate 11, as previously described during exposure, the filter, in mathematical terms, becomes multiplied with the subject image. If the product, as developed on plate 11, is illuminated by coherent light and a Fourier transform optically obtained, the Fourier transform will contain the transform of the subject image convolved with the transform of the filter. Spatial filtering, i.e., filtering of spatial frequencies in a transform plane, can be used to modify the dynamic characteristics of the photographic image and the inverse transform step will bring back the image as modified. Contrast control using density filters and spatial filtering in a coherent optical system is described in detail with reference to FIGS. 7 and 11. FIG. 7 illustrates an optical system using coherent light source 27, collimator 28, support means 30 for supporting an object transparency 31, transform lens 32, mounting means 33 for mounting a spatial filter 35, retransform lens 36 and image receiving means 37. Light source 27 must be sufficiently coherent so as to illuminate an object in support 30 with substantially no variation in phase across the object.

Support 30 is positioned to hold an object in the front focal plane of transform lens 32 while mounting 33 is positioned to hold a spatial filter in the back focal plane of lens 32. Retransform lens 36 is spaced in back of lens 32 by the sum of their two focal lengths. Image receiving means 37, suitably recording means on a display screen is placed in the back focal plane of lens 36.

The position details given above are the simplest and considered the preferred arrangement; however, the only critical details are that mounting 33 should hold a spatial filter at a position where the beam from collimator 28 would focus substantially to a point if undisturbed. Image receiving means 37 must be in an image plane but not necessarily the back focal plane of lens 36.

Further details of spatial filtering techniques and optical arrangements therefore are known to the art.

Figure 8:
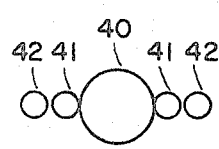
FIG. 8 illustrates the Fourier transform of the square wave filter of FIG. 5.

FIG. 8 depicts the Fourier Transform of the square wave filter of FIG. 5. The center circle 40 is the light spot of greatest intensity and is called the zero order or "DC spot." Two first order spots 41 and two second order spots 42 are also shown.

For an object, such as wedge 17 multiplied by vertical bar square wave filter 23, each order contains the spectrum of wedge 17. With a spatial filter passing only DC spot 40 in the Fourier transform plane of FIG. 7, the image received at 37 would have approximately the characteristics depicted by dashed line 26 in FIG. 6. However, if DC spot 40 is blocked and only one of the higher orders is passed, the image intensity will be a function of the "chop" amplitude as well as the light intensity.

Referring back to FIG. 6 it will be noted that the "chop" amplitude starts at zero, increases to a peak and then decreases again to zero. The effective dynamic range curve for the image produced by filtering out all but a higher order spot as described above will thus be a peaked curve dropping to zero at both ends. With proper density filter design, this can act like a narrow pass band filter in which contrast over any small selected exposure range is greatly enhanced.

Figure 9:
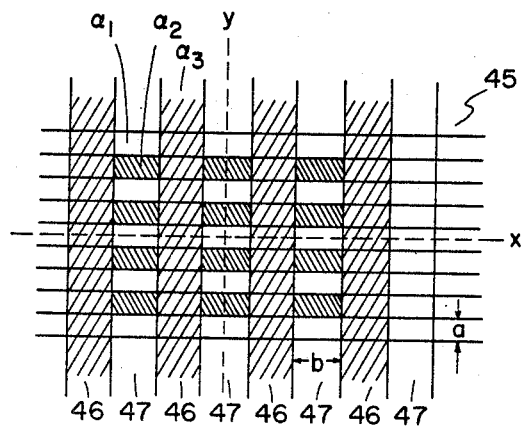
FIG. 9 illustrates a mosaic density filter in accordance with the invention.

FIG. 9 illustrates an exemplary mosaic density filter 45 that can be used to obtain several different dynamic range curves with the use of spatial filtering techniques. Filter 45 is illustrated as comprising horizontally alternating vertical bars. A first series, for example, the even bars 47, alternate vertically between first and second densities. The odd bars 46 have a third density. The areas of different density have been labeled $a_1$, $a_2$ and $a_3$ respectively.

The fundamental frequency of the mosaic filter is determined by the scene frequency information that is desired and the resolution of the film used in conjunction with the filter. The fundamental filter frequency should be at least twice that of the highest scene frequency to be resolved and considerably less than the resolution limit of the film to enable a clear print of the filter transmission zones.

Two fundamental frequencies are present in FIG. 9 having half periods $a$ and $b$. Nothing requires that the frequencies be distinct or that any particular set of transmission densities be used. The Fourier transform of the mosaic filter in the $x$ or $y$ direction will depend on the amplitude of the modulation in these respective directions. One set of densities used for a mosaic filter corresponding to FIG. 9 were:

| Area: | Density |
|---|---|
| $a_1$ | 0.12 |
| $a_2$ | 2.29 |
| $a_3$ | 3.29 |

Figure 10:
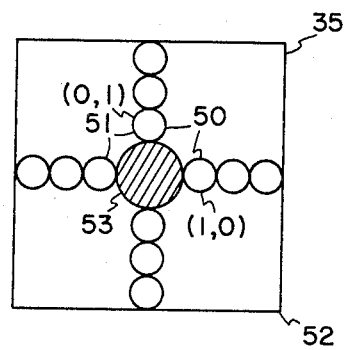
FIG. 10 illustrates the Fourier transform of the mosaic filter of FIG. 9.

The Fourier transform of mosaic density filter 45 will resemble the pattern illustrated as illuminating spatial filter 35 in FIG. 10. Only the smaller circles of the pattern will show if the filter alone is used with no scene information. When the filter is multiplied with a scene, the diameter of larger circles 51 will be directly related to the maximum scene frequency. Filter 35 is illustrated as an example made of an opaque member 52 containing central transparent aperture 53 for transmitting only the zero order of the transform. Other filters would pass one or more orders along the $x$ and $y$ axes. For example, one filter would contain a transparent aperture at only the first order on the $x$ axis (1, 0). Another filter would have a transparent aperture at only the first order on the $y$ axis (0, 1).

Figure 11:
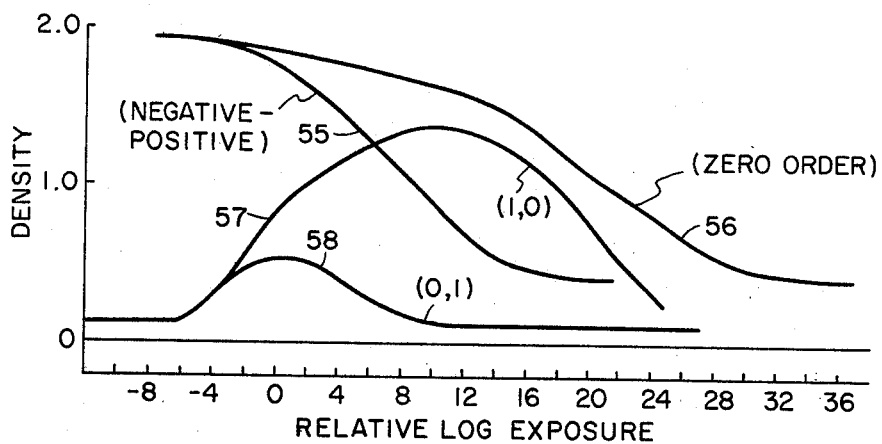
FIG. 11 is a graphical representation of the effective intensity vs. exposure curves obtainable with a mosaic filter.

FIG. 11 shows characteristic curves obtained with the invention system. Curve 55 is the conventional process negative to positive curve. This will be recognized as similar to the inverse of the FIG. 3 H and D curve which is a positive to negative process curve. Curve 56 shows a characteristic response obtained with spatial filter 35 passing the zero order of the transform. A greatly extended dynamic range is obtained. Curve 57 was obtained with a spatial filter passing a first order $x$ axis spot and curve 58 obtained with a spatial filter passing a first order $y$ axis spot. Curves 57 and 58 show high contrast response introduced by the inversion of the right hand portion of the curve.

In order to determine the effective characteristic curves obtainable with a given mosaic filter, it is first necessary to determine the transmission characteristics of the filter as related to locations at the transform plane. Three proportionality relationships have been found useful for this purpose. These relationships for filter 45 assuming ideal square waves with equal bars and spaces are as follows:

(1) $$F_{0,0} \approx \frac{a_1 + a_2 + 2a_3}{4}$$

(2) $$F_{1,0} \approx \frac{a_1 + a_2}{4} - \frac{a_3}{2}$$

(3) $$F_{0,1} \approx \frac{a_1 - a_2}{4}$$

where:

$F_{0,0}$ is light amplitude of the zero order in the transform $F_{1,0}$ is the light amplitude of the first $x$ axis order in the transform $F_{0,1}$ is the light amplitude of the first $y$ axis order in the transform $a_1$, $a_2$, $a_3$ are the amplitude transmissions related to the respective filter areas.

Transmission of the mosaic filter image depends on the illumination in the scene image. Scene image liminance can be treated as a parameter that moves the three densities (three densities in filter 45) along the base line of the photographic characteristic curve and produces a set of densities in the negative. That is, the negative responds to the scene luminance as transmitted through the mosaic density filter.

In calculating the system curves, a large range of scene luminances are divided into increments and at each increment the negative response is calculated for each mosaic filter zone. Calculations are also made for no filter to obtain a comparison curve. The transmission of the negative was obtained for each increment of the scene luminance and the associated log intensity applied to the characteristic curve of the film. The densities obtained were plotted against the log exposure of each increment of luminance. The result is a negative-positive process curve 55 shown in FIG. 11.

Following the technique of the invention, calculations can be made to show the net system response with spatial filtering. Having calculated the negative response with each increment of luminance and for each zone of the mosaic filter, the amplitude transmission $a_1$, $a_2$, and $a_3$ of the respective zones in the modulated negative can be determined. The average transmission of the three zones can be plotted using relationship (1) above and will give the zero orders amplitude of the transform. To find the density of the filtered zero order image, the logarithm of the intensities associated with the average transmission is again applied to the characteristic curve of the film. The densities, assuming nominal exposure, are then determined for each scene luminance increment. The zero order curve 56 of FIG. 11 is obtained by plotting the densities against the respective log exposure of the scene. This then is the characteristic curve associated with filtering the DC term of the modulated scene negative.

The (1, 0) and (0, 1) curves 57 and 58 respectively shown in FIG. 11 represent the characteristic curves associated with filtering the first order term in the $x$ and $y$ directions respectively. The intensities of each luminance increment detained by filtering first order terms depends on the amplitude of the modulation of that step. The amplitude of the modulation depends on the cutoff limit of the film used. The curves illustrated in FIG. 11 are based on Pan-X (Eastman Kodak) Sheet Film developed to a gamma of 0.75. With the parameters of this film, the amplitude was caluculated for each scene luminance increment and the average amplitude transmission determined. See relationships (2) and (3) above for obtaining average amplitude transmission for first order terms on the $x$ and $y$ axes. As before, the density of the filtered image was obtained by applying the logarithm of the intensities associated with the average amplitude transmission to the charactistic curve for the film. The data obtained was used to plot the (1, 0) curve 57 and the (0, 1) curve 58 of FIG. 11.

FIGS. 12 to 16 illustrate a suitable camera mechanism for use in accordance with the invention. This can be, for example, a 35 mm. roll camera having body 60, lens assembly 61, back 62, roll film mounts 63 and 64 carrying film reels 65 and 66. A pneumatic pad 67 is mounted on the inside of back 62 to provide a pressure pad for film 68 in the exposure plane of the camera. A shutter 69 is depicted in lens assembly 61 by a dashed line.

Mechanism 70 supports a filter 71 and is operable to press filter 71 firmly against film 68. The film winding means is partially illustrated by lever arm 72. Lever arm 72 operates a cam 73 which in turn operates mechanism 70. Lever arm 72 also operates through a gearhead 75 to transport film 68 one frame at a time.

Mechanism 70 is illustrated in detail in FIG. 16. It comprises an inner frame member 76 upon which filter element 71 is mounted. Filter element 71 is mounted on frame 76 by adhesive bonding as illustrated or by suitable clamping means. Frame 76 also contains four slots 77, two in each of its top and bottom members. These slots are cut aslant with relation to the axes of the respective members. Inner frame members 76 is adapted for freely movable positioning inside outer frame member 78. Outer frame member 78 contains slots 80 extending the length of its top and bottom members. With inner frame 76 positioned inside outer frame 78, slots 77 in frame 76 intersect with slots 80 in frame 78. Driving means 85 comprises a top member 82, a bottom member 83, and an end member 81 connecting top and bottom members 82 and 83 at one end to form a rectangular shape open at the other end. Pins 86 project inwardly two from each of top and bottom members 82 and 83. Top and bottom members 82 and 83 of driving means 85 are adapted for sliding inside of channels 87 and 88 in the top and bottom members respectively of outer frame 78. With driving means 85 engaged with outer frame 78, pins 86 of driving member 85 project through slots 80 in outer frame 78 to engage with slots 77 in inner frame 76. It will be observed that with this arrangement a back and forth movement of driving means 85 will cause inner frame 76 to move in and out of outer frame 78 as a result of the slant of slots 77 of inner frame 76. A spring 90 as depicted in FIG. 12, is disposed between and end plate 91 at the end of channel 87 of outer frame 78 and an end plate 92 at the end of top member 82 of driving means 85. Spring 90 is depicted as a helical compression spring which tends to force driving means 85 away from end plate 91 of outer frame 78. Slots 77 are set aslant at an angle such that when spring 90 is extended as far as the lengths of slots 77 permit, inner frame 76 is retracted into outer frame 78.

Referring to FIG. 13, it will be seen that this displaces filter element 71 away from pneumatic pad 67 and film 68. Cam 73 engaged for rotation with lever arm 72 rides against a roller 93 mounted on driving means 85. Cam 73 has a projection 95 which is in the position of rotation depicted in FIG. 13 operates against roller 93 to position driving means 85 against spring 90, compressing spring 90 and forcing iner frame 76 out of the outer frame 78 so that filter element 71 is forced tightly against pneumatic pad 67 uniformly contacting film 68 therebetween.

In operation unexposed film from reel 66 is drawn onto the exposure plate by rotating lever 72 in a clockwise direction. Lever 72 operates through a gearing arrangement in gearhead 75 to move one frame of unexposed film onto the exposure plate during a single rotation of lever 72. The first clockwise movement of lever arm 72 moves projection 95 of cam 73 away from roller 93 so that filter element 71 is retracted away from contact with the film. During this first portion of rotation of arm 72 a conventional lost motion arrangement in gearhead 75 prevents movement of film 68 until filter element 71 has been retracted out of contacting. When lever arm 72 has been rotated a full turn a flat face on projection 95 of cam 73 contacts roller bearing 93 preventing further movement of arm 72. Arm 72 is then rewound in a counter-clockwise direction for a full turn so that roller bearing 93 again rides up onto projection 95 of the cam forcing filter element 71 uniformly against film 68. This sequence is repeated for each exposure so that during exposure, filter element 71 is pressed uniformly against film 68, while during winding of the film filter element 71 is retracted out of contact. Pneumatic pad 67 operates as a flexible cushion to assure uniform contact pressure between filter element 71 and film 68.

The particular mechanism described is only by way of example. Presently available cameras contain operative mechanisms that could be utilized to move the filter of the invention in the manner described. These cameras are designed with pressure plates for clamping the film tightly in the focal plane during exposure and then releasing pressure during the film winding to permit the film to be wound freely in a straight line between reels. Examples are the Koni-Omega Rapid, as described in Photo Methods for Industry (PMI), vol. 8, No. 12, December 1965, pages 9 to 22 and available from Konica Camera Corp., 257 Park Avenue So., New York, N.Y. and some of the cameras available from Minolta Corporation, 200 Park Avenue, New York, N.Y.

What is claimed is:

1. In a photographic image reproduction process comprising focusing a light image of a subject to be reproduced, illuminating a photosensitive medium with said light image and developing said medium to form a record image of said subject, the combination in illuminating said photosensitive medium comprising spatially periodically modulating said light image by multiplying said image with a neutral density filter comprising a plurality of interlaced periodic patterns of filter elements of like density value, the patterns representing at least three different values of transmissivity.

2. A method of photographic image reproduction according to claim 1 in which modulating is performed by placing said filter adjacent to one of said subject or said medium.

3. A method of photographic image reproduction according to claim 2 in which said filter is a transmission filter comprising a first plurality of areas of a first optical density, a second plurality of areas of a second optical density, and a third plurality of areas of a third optical density.

4. A method of photographic image reproduction according to claim 1 in which the average filter density varies periodically between a first set of predetermined values along one axis across the filter and varies periodically between a second different set of predetermined values along a second axis across the filter.

5. A method of controlling contrast in a photographic image comprising focusing a light image of a subject to be reproduced, multiplying said image with a neutral density filter comprising a plurality of interlaced periodic patterns of filter elements of like density value, the patterns representing at least three different values of transmissivity, illuminating a photographic medium with said light image, developing said image to form a record image of said subject, forming a Fourier transform of said record image in a Fourier transform plane, filtering spatial frequencies in said transform plane to pass an image with the desired contrast characteristics, and retransforming said Fourier transform.

6. A method of controlling contrast according to claim 5 in which said filtering in said transform plane passes only the D.C. spot providing a low contrast image on retransformation.

7. A method of controlling contrast according to claim 5 in which said filtering includes blocking the D.C. spot and passing higher order spatial frequencies related to said periodic density variations along one of said one axis and said second axis whereby a high contrast image is obtained after retransformation with contrast emphasized over a narrow portion of the density vs. exposure curve of said first image.

8. In a photographic image reproduction process comprising focusing a light image of a subject to be reproduced and illuminating a photosensitive medium with said light image; the combination in illuminating said photosensitive medium comprising the steps of modulating said light image with a filter having a plurality of interlaced patterns of neutral density filter elements of like density value each pattern extending across said image in a unique direction, said patterns representing at least three different values of transmissivity.

9. A photographic image reproduction process according to claim 8 comprising the further steps of developing said medium to form a stored image of said subject with said modulations thereon, Fourier transforming said image to a Fourier transform plane, and filtering selected spatial frequencies in said transform plane.

References Cited

UNITED STATES PATENTS

| | | | |
|---|---|---|---|
| 2,959,105 | 11/1960 | Sayanagi | 350—164 |
| 3,090,281 | 5/1963 | Marechal et al. | 88—24 |
| 3,108,383 | 10/1963 | Gabor | 88—24 |
| 3,320,852 | 5/1967 | Parrent et al. | 350—162 X |

VERLIN R. PENDEGRASS, Primary Examiner

U.S. Cl. X.R.

355—2